(12) United States Patent
Iverson et al.

(10) Patent No.: US 6,938,005 B2
(45) Date of Patent: Aug. 30, 2005

(54) DIGITAL CONTENT DISTRIBUTION

(75) Inventors: Vaughn Iverson, Beaverton, OR (US); Todd Schwartz, Portland, OR (US)

(73) Assignee: Intel Corporation, Santa Clara, CA (US)

(*) Notice: Subject to any disclaimer, the term of this patent is extended or adjusted under 35 U.S.C. 154(b) by 637 days.

(21) Appl. No.: 09/745,323

(22) Filed: Dec. 21, 2000

(65) Prior Publication Data

US 2004/0078293 A1 Apr. 22, 2004

(51) Int. Cl.$^7$ ............................. G06F 17/60; H04L 9/00
(52) U.S. Cl. ......................................... 705/27; 705/51
(58) Field of Search ............................. 705/27, 51, 52; 707/102

(56) References Cited

U.S. PATENT DOCUMENTS

| | | | | |
|---|---|---|---|---|
| 5,893,132 A | * | 4/1999 | Huffman et al. | 715/532 |
| 5,963,909 A | * | 10/1999 | Warren et al. | 705/1 |
| 6,055,514 A | * | 4/2000 | Wren | 705/27 |
| 6,123,362 A | * | 9/2000 | Squilla et al. | 283/67 |
| 6,167,382 A | * | 12/2000 | Sparks et al. | 705/26 |
| 6,226,618 B1 | * | 5/2001 | Downs et al. | 705/1 |
| 6,233,682 B1 | * | 5/2001 | Fritsch | 713/168 |
| 6,385,596 B1 | * | 5/2002 | Wiser et al. | 705/51 |
| 6,437,801 B1 | * | 8/2002 | Cave | 345/723 |
| 6,587,837 B1 | * | 7/2003 | Spagna et al. | 705/26 |
| 6,609,146 B1 | * | 8/2003 | Slotznick | 709/200 |
| 6,611,812 B2 | * | 8/2003 | Hurtado et al. | 705/26 |
| 6,673,860 B1 | * | 1/2004 | Grutke et al. | 524/445 |
| 6,684,240 B1 | * | 1/2004 | Goddard | 709/217 |
| 6,714,909 B1 | * | 3/2004 | Gibbon et al. | 704/246 |
| 2001/0037311 A1 | * | 11/2001 | McCoy et al. | 705/65 |
| 2002/0099623 A1 | * | 7/2002 | Yukino | 705/27 |
| 2002/0156737 A1 | * | 10/2002 | Kahn et al. | 705/51 |
| 2004/0117272 A1 | * | 6/2004 | Shehab | 705/27 |

FOREIGN PATENT DOCUMENTS

JP         11085504 A    *   3/1999

OTHER PUBLICATIONS

U.S. Appl. No. 60/183,627.*
Panepinto, J., "Sitters and Nannies, for Kids and Adults," USA Today, Feb. 24, 1999, Final Edition, Life section, p. 6D.*

* cited by examiner

Primary Examiner—Nicholas D. Rosen
(74) Attorney, Agent, or Firm—Steve D. Yates

(57) ABSTRACT

A manifest is created that represents a created work in electronic form. The manifest may reference multiple digital resources that together make up the good, as well as related resources not originally a part of the good. For example, an electronic version of a music album may include image files for the cover art, audio files for the songs, and text files for the lyrics. The manifest may include structured meta-data to facilitate finding, obtaining, exchanging the digital content. The manifest and referenced content may have associated meta-data describing, for example, manifest contents or distribution rules. A receiver of the manifest may apply global and/or user rules or policies to meta-data to determine what portions of the manifest, if any, comply thereto, and to edit or delete the manifest accordingly.

14 Claims, 5 Drawing Sheets

FIG. 3

```
<PACKAGE>
<ITEM>
    <CHOICE CHOICE_ID="ID" TYPE="multiple">
        <DESCRIPTOR NAME="DESCRIPTION"
            VALUE="Choose Songs">
            Would you like to pick which songs to receive?
        </DESCRIPTOR>
        <SELECTION SELECT_ID="PICK_SONGS">
            <DESCRIPTOR NAME="DESCRIPTION"
                VALUE="GET ALL">  Choose individual songs.
            </DESCRIPTOR>
        </SELECTION>
    </CHOICE>
    <CHOICE CHOICE_ID="SONG_PICKER"
            DEFAULT="SONG1 SONG2"
            TYPE="multiple">
        <CONDITION REQUIRE="PICK_SONGS"/>
        <DESCRIPTOR NAME="DESCRIPTION"
            VALUE="Choose Songs">   Choose the songs you would like:
        </DESCRIPTOR>
        <SELECTION SELECT_ID="SONG1">
            <DESCRIPTOR NAME="DESCRIPTION">
                <INTERNAL_REF IDREF="SONG1_TITLE"/>
            </DESCRIPTOR>
        </SELECTION>
        <SELECTION SELECT_ID="SONG2">
            <DESCRIPTOR NAME="DESCRIPTION">
                <INTERNAL_REF IDREF="SONG2_TITLE"/>
            </DESCRIPTOR>
        </SELECTION>
    </CHOICE>
    <CHOICE CHOICE_ID="BITRATE_CHOICE"
            :
    </CHOICE>
    <DESCRIPTOR NAME="TYPE"         VALUE="RECORDING_ALBUM"/>
    <DESCRIPTOR NAME="rating"       ID="ALBUM_RATING"
                                    VALUE="safe for kids"/>
    <DESCRIPTOR NAME="TITLE"        VALUE="The Title"
                                    ID="ALBUM_TITLE">
                                    The Title
    </DESCRIPTOR>
    <DESCRIPTOR NAME="CREATOR"
                :
    <DESCRIPTOR NAME="CONTRIBUTOR"
                :
    <DESCRIPTOR NAME="PUBLISHER"
                :
    <DESCRIPTOR NAME="RIGHTS"
                :
    </DESCRIPTOR>
                :
```

6,938,005 B2

DIGITAL CONTENT DISTRIBUTION

FIELD OF THE INVENTION

The invention generally relates to distribution of digital content, and more particularly to creating, a manifest having structure, meta-data describing digital content, and references to digital resources, where the manifest facilitates finding, obtaining, organizing, collecting, and sharing the digital content.

BACKGROUND

Computing devices, such as a personal computer, typically employ a folder/document metaphor for storing and organizing content. While such a metaphor is well suited to an office environment, where content is typically in the form of documents, it is not effective when applied to the use and management of arbitrary digital content. For example, a digital photo album may be defined to correspond to a physical photo album. Thus, certain photos and/or textures may be identified as corresponding to front and back covers for the photo album, and other photos identified as being internal to the album. All content within the album would be stored in a folder or hierarchy of folders. Unfortunately, such a hierarchy lacks cohesion or inherent structure found in a physical photo album. Thus, while a real photo album can be easily organized, shared, etc., there is no standard method for doing so with the hierarchy for the digital photo album.

One solution has been to apply an encapsulating structure (e.g. zip or tar file) to the hierarchy and thus create an archive containing all of the digital content. This archive can then be exchanged, sold, etc. A significant drawback to such an archive is that it is monolithic, e.g., it contains all data within the album. This reduces the transferability of the album, and restricts selective transfer of only some album contents. In addition, an archive generally lacks data describing the context and contents of the photo album (e.g., meta-data), thus making it difficult to organize and search/find digital content, and to avoid having duplicative digital content. For example, once the archive it received, it needs to be re-created in a folder structure corresponding to the original hierarchy structure, or risk internal references to files being lost. This prevents or restricts moving, organizing, and re-organizing digital content.

In addition, assuming the user can maintain the proper structure of the content, also lacking to such an archive is an easy, robust, and widely-supported method for searching digital content. For example, for music data, without excessive redundancy, folder organization techniques cannot help if you want to locate a song played based on multiple criteria, such as mood and music type, since music would generally fall into multiple categories and thus require entry in multiple folders.

Similarly, one cannot select a video starring a certain actor and start viewing at a particular scene, hum a bar of a tune and have the system find it for you, or find all photos taken at an event last year. These tasks cannot be performed because mere hierarchical storage of digital content lacks associative or context data, such as captions, dates, places, copyrights, artist, author, genre, etc. to allow identification of digital content based on such search criteria.

Assuming the digital content can be located, exchanging the digital content is difficult due to a lack of open and flexible standard to do so. Existing digital content packaging schemes are proprietary and tailored to specific content types, such as for electronic books or music. Currently there is no technology for uniformly packaging, in electronic form, a wide variety of digital content in a way that qualifies the content as what the entertainment industry calls a "title."

BRIEF DESCRIPTION OF THE DRAWINGS

The features and advantages of the present invention will become apparent from the following detailed description of the present invention in which:

FIG. 3 illustrates, according to one embodiment of the invention, portions of an XML skeleton for implementing the FIG. 2 manifest.

DETAILED DESCRIPTION

To address limitations in management and distribution of digital content, a system may be used for uniform electronic packaging of digital content independent of content type, along with automated distribution of digital content to desired recipients. The phrase "digital content" refers to digital representations of created works, such as multimedia items including photo albums, music albums, novels, magazines, and the like, as well as entirely new forms of content that may emerge in the electronic realm. The phrase "electronic package" means an instance of digital content that exists in some computer accessible medium, such as on a wire, in computer memory, on a storage device, etc.

The illustrated embodiments of the invention may represent, or package, abstract created works in a concrete electronic digital form, as well as provide an electronic analog to traditional physical goods. For example, a CD-ROM or vinyl album is simply a physical representation of the abstract concept "music album"; a book is simply a physical representation of the abstract concept "novel." But, it will be appreciated that these exemplary album and novel concepts have been largely defined with respect to the limitations of their physical representations. And, these abstract forms can be faithfully represented in an electronic form. However, it should be appreciated that since a non-physical electronic realm lacks limitations of physical objects, and therefore abstract forms of created works can morph and evolve in ways unpredictable, and perhaps not physically possible.

Thus, an electronic package may be structured to correspond to, or mimic, a physical good. For example, an electronic package corresponding to a music compact disc (CD) can be defined as having packaging, cover illustrations, organization, etc., corresponding to a physical CD. However, unlike the physical good, in an electronic realm, the electronic package may also include meta-data describing the parts, and/or context of the packaged digital content, rules controlling distribution of the digital content, as well as references to content related to but not part of the physical good.

In one embodiment, an electronic package of digital content is represented by a "manifest" (see FIG. 2) that appears as a single unit, or item, to a user/receiver of the manifest. The manifest comprises "component" definitions corresponding to components of the digital content, each component definition specifying a reference to a digital resource.

Figure 1:
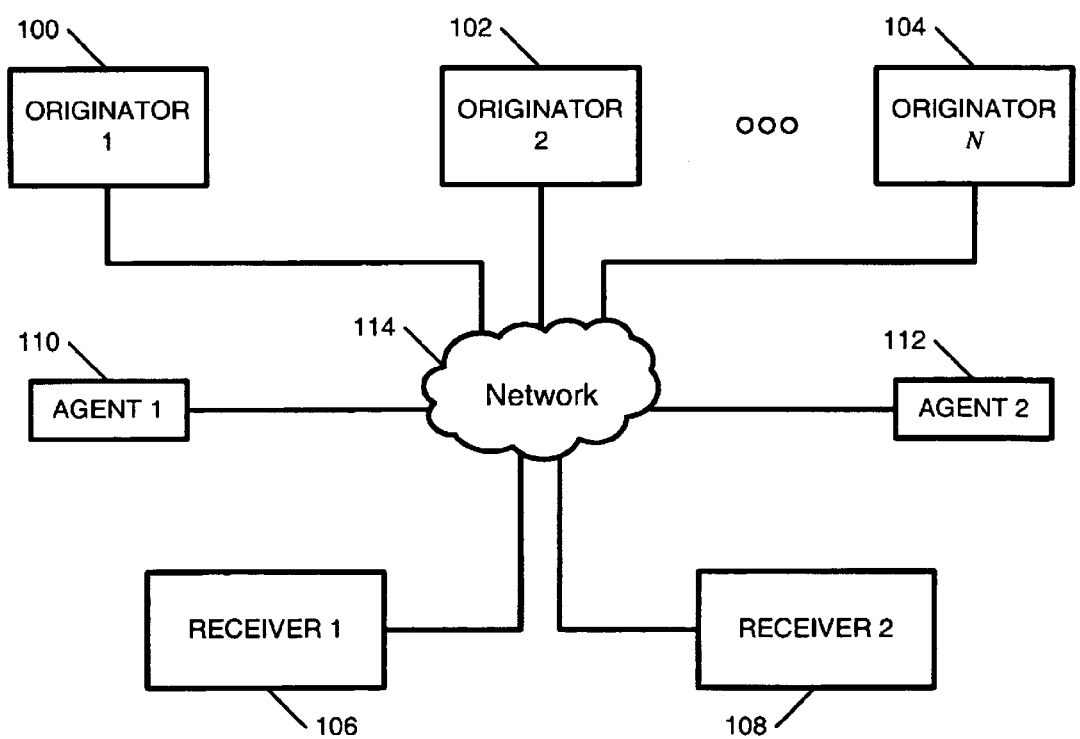
FIG. 1 illustrates a generalized network environment according to one embodiment of the invention.

FIG. 1 illustrates a general computing environment according to one embodiment of the invention. As illustrated, a manifest for an electronic package is created or transmitted by an originator 100–104, and received by a receiver 106, 108. It will be appreciated that the terms "receiver" and "originator" are arbitrary, in that one may also perform the operations of the other. Agents 110, 112 facilitate transfer of manifests from originators to receivers. Originators, receivers, and agents are in communication with each other over a network 114 such as an intranet, the Internet, or other network. There may be other networks, not illustrated, providing alternate or direct connections between the agents, originators, and/or receivers.

Agents include, for example, search engines used by a receiver to locate digital content of interest to the receiver, order processing systems for responding to and fulfilling purchase requests, and systems that customize content en route for specific locales. Agents can incorporate arbitrary "intelligence" that facilitate buying, selling, trading, bartering, lending, etc. of digital content. In one embodiment, originators and receivers may also perform the functions of an agent.

Thus, receiver 1 106 may contact Agent 1 110, and indicate interest in obtaining a certain classical music CD as digital content. If Agent 1 cannot directly provide the requested digital content, Agent 1 contacts Agent 2 112 over the network 114, and request the desired digital content. Assuming Agent 2 can fulfill the request, Agent 2 sends Agent 1 a manifest corresponding to the requested digital content.

It will be appreciated that typical content distribution services, such as Universal Music Group's bluematter and BMG (both online music providers), and Flycode (a peer-to-peer short film distribution network), already allow one to obtain digital content over a network. (Please note that all marks herein are the property of their respective owners.) However, a significant limitation of such services is that received content is a monolithic encapsulation, it contains all parts of the digital content whether one wishes to receive it or not. Thus, for a music album, the receiver would receive all data for all songs within the album, which may potentially include multiple encodings of each song, etc. This contrasts distribution by way of a manifest, which may only contain references to digital resources, allowing advance determination of which parts, if any, of the content to obtain before expending resources to receive it.

Another limitation of prior art techniques is that the content is rigidly structured. For example, bluematter and BMG can provide a "song," or an "album," but these are content forms that cannot be easily extended to include other types of content, such as video clips, discount coupons, etc. Such content is also inflexible in the types of metadata that can be included. For example, fixed file formats (e.g., MP3, WMA, etc.) typically used in such services have specific notions of what constitutes appropriate metadata for a music album or an individual song. This results in limitations in what data may be represented, and how, thus limiting general applicability of the file format. Such systems are tightly bound with specific encoding formats, and are difficult to upgrade when technological improvements are made.

Figure 2:
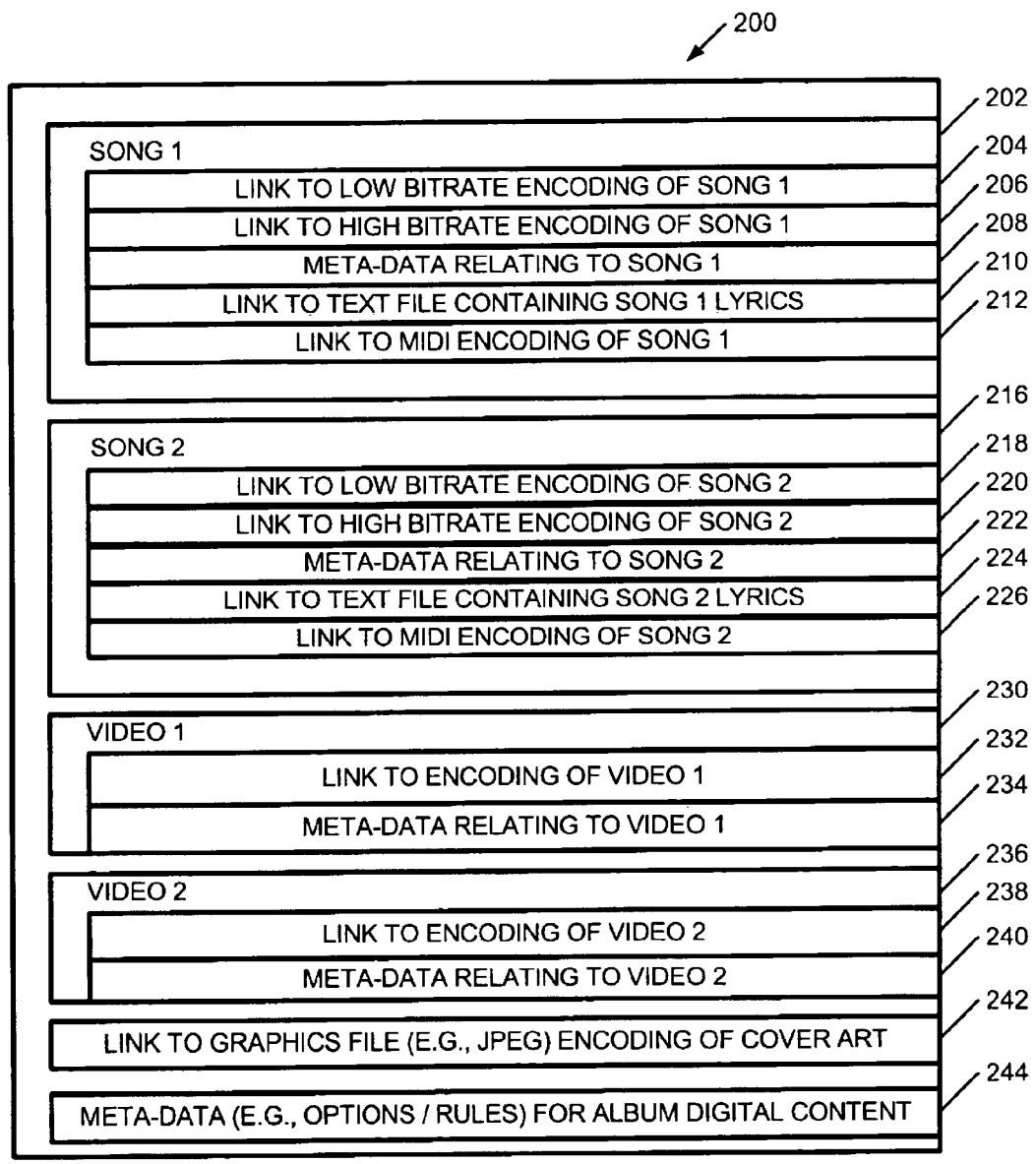
FIG. 2 illustrates one embodiment of a manifest for representing digital content corresponding to a music album.

FIG. 2 illustrates one embodiment of a manifest 200 for representing digital content corresponding to an abstract music album. It will be appreciated, however, that a manifest may also be used to electronically represent particular physical implementations of the abstract idea, e.g., to represent compact discs, vinyl albums, etc. It is assumed the manifest is created with an appropriate manifest generation/authoring tool. The manifest binds together various types of resources in their original authored formats. In one embodiment, the manifest only references data that can be created with well known or standard data authoring tools, such as MP3 generators, video editing software, etc.

As illustrated, the manifest 200 itself corresponds to a top, or outer, level. Within the illustrated manifest are six item declarations corresponding to two songs 202, 216, two videos 230, 236, cover art graphics 242 and meta-data 244. The meta-data 244 may contain distribution rules, requirements, or policies (hereafter "rules or policies") regarding handling of the manifest, or the digital content described by the manifest.

Items (and sub-items) can have sub-items. For example, as illustrated, song 1 202 contains references 204, 206 to different encodings of song 1, meta-data 208 describing song 1, a reference 210 to lyrics for song 1, a reference 212 to a musical instrument digital interface (MIDI) encoding of song 1. The references 204, 206 to the different encodings allow providing different encodings of a song, such as a high bit rate version and a low bit rate version, allowing a receiver 106, 108 (FIG. 1) to elect a version based on certain criteria. For example, a receiver may elect a version based on communication data rates available to the receiver. The meta-data 208 for song 1 202 may include song data such as playing time, composer, recording date, copyright information, and the like.

The meta-data for song 1 202 may also contain pricing information for each song encoding, e.g., the high bit rate encoding 206 for song 1 may cost more than the low bit rate 204 encoding. The meta-data may also include other data such as content ratings, intended audience ratings, e.g., an indicator the song is intended for kids, teenagers, adults, etc., song genre, geographic distribution rules, e.g., different geographic regions receive different song versions, parental controls, etc. The manifest primarily contains references to digital resources, rather than directly embedding the resources. The meta-data may be used to determine how to handle digital resources referenced by the manifest (see FIG. 5). The meta-data can also be inspected to prevent duplicative retrieval of digital resources already be present in a cache or local storage, e.g., saved to disk or a collection. Duplicative retrievals unnecessarily burden networks and increase purchase costs and delivery times.

The illustrated manifest 200 also includes videos sections 230, 236 having references 232, 238 to video clips of concerts, music videos, or other video data related to the physical good described by the manifest. As with the songs, 202, 216, the video sections 230, 236 may have associated meta-data 234, 240, such as title, running time, content ratings, and other such data as discussed above for song data. It will be appreciated that video data is not ordinarily part of a music CD distribution. However, since the manifest contains references to digital resources, rather than the resources themselves, it is easy to extend the manifest to include varied data typically associated with the music CD, even though such an inclusion would be impractical or cost ineffective to distribute along with the physical CD, or obtain along with a traditional monolithic download.

As illustrated, the manifest may also include a reference 242 to a graphics file, such as for a graphics encoding of the cover art for the music CD. Such graphics data facilitates presenting, by way of a user interface, a visual representation, such a picture of the cover of an album, or other representative view, of the created work being represented by the manifest.

It is assumed that an appropriate user interface, such as a text-based or graphical-based interface is used to identify digital resources to include in the manifest, and to create the manifest accordingly. In one embodiment, the same user interface is used to process received manifests. In one embodiment, the graphical user interface is based on an Internet browser. In one embodiment, the manifest includes security provisions to detect unauthorized tampering with the manifest. In one embodiment, the manifest is cryptographically signed. In another embodiment, some or all of the manifest is encrypted with a private and/or known public cryptographic systems. See, e.g., *Applied Cryptography: Protocols, Algorithms, and Source Code in C* by Bruce Schneier.

FIG. 3 illustrates, according to one embodiment of the invention, portions of an XML skeleton 300 for implementing the FIG. 2 manifest 200. The extensible Markup Language (XML) is used due to its widespread industry support and structures for organizing data. XML allows creation of custom tags, which enables defining, validating, and interpreting transmitted manifests. It will be appreciated, however, that other languages, such as tag based languages, or scripting languages, may also be used. In addition, in one embodiment, a binary data standard (e.g., cross-platform readable) may be used to encode a manifest. In general, any data format that allows data sets to be named, and hierarchically structured, can be used.

A first tag 302 indicates the beginning of a music package definition, or container, for the digital content defined by the manifest. The package has multiple defined items. A first item 304 contains information about the "digital item" (in this case, an electronic version of a music album) described by the manifest, and configuration options regarding handling the contents of the package, e.g., how to prompt a receiver regarding processing songs and other digital content referenced by the manifest.

Each defined item, and the manifest itself, may have arbitrary meta-data to allow associating real-world context with an item. Meta-data is introduced with descriptor tags 320, 322 having definitions 324. A descriptor tag NAME attribute indicates the metadata attribute being defined, and the VALUE attribute supplies an appropriate value. The first item 304 includes a choice tag 306 identified with an ID 308 to allow a receiver of the manifest to choose how to receive songs referenced by the manifest. A selection tag 310, e.g., "pick songs," provides an option for selecting songs individually. It will be appreciated that other selection options, or no options, may be provided.

A subsequent choice tag 312 indicates available songs, e.g., SONG1, SONG2, from which to choose. Note that the choice tag 312 has a condition tag 314 requiring the above "pick songs" selection tag 310. This condition must be satisfied before this choice 312 is acted upon, and it operates in the context of the previous choice tag 306. In such fashion, manifests may be structured to provide choices based on previous selections. Subsequent selection tags 316 define songs that may be individually selected.

A following tag 318 indicates a start of a manifest section for selecting a desired bit rate desired for selected songs. As above with song selection, bit rate selection options (not illustrated) may be included to operate with respect to the method employed for song selection. For example, if an election is made to individually pick songs, then one may be prompted for each song to select a desired bit-rate.

Other choice tags may also be defined to control delivery of the digital content to another party, e.g., to include an address book to facilitate sale or transfer of digital content to another receiver. Tags may also be defined to prompt a receiver to identify a computing platform receiving the manifest, e.g., desktop computer, portable, hand-held device, personal digital assistant (PDA), as each such device may have different format requirements, storage capacities and interface capabilities.

Tags may also be defined to indicate the operating system in use by the receiving device, and to control whether to obtain extra content, such as related videos 230, 236, cover art and related package graphics, lyrics, press reviews, etc. Tags may also be defined to indicate data format preferences, e.g., graphics images should be converted (if necessary) into Joint Photographic Experts Group (JPEG) format images, or videos should be in a particular format.

Following various choice tags, are descriptor tags 322 that are at the same hierarchical level as the first item 304 definition, e.g., a music compact disc, and therefore define 324 typical characteristics for the disc. Exemplary illustrated characteristics include the type of music disc defined by the item 304 (an album), an audience rating, album title, creator, contributor, album publisher, and album rights (e.g., copyright information). As discussed above, any of these attributes can be used to control or facilitate organization, content filtering, and re-distribution of digital content.

This description assumes the receiver is a person using an application program or device configured to receive and/or process the manifest, and display choices accordingly. However, note that the receiver may be another application program or device, such as one operating to automatically apply local policies or rules to received manifests, before a manifest is received by a person. In particular, there may be local policies, such as parental controls, and these policies may be used to cause a rewriting of the manifest, e.g., per XML rewriting rules, so that the manifest excludes references to undesirable content.

It will be appreciated that the exemplary FIG. 3 skeleton may be constructed with content and features to free a user from tedious download processes, and from the need to know or understand file formats or plug-ins (e.g., application program enhancements designed to process a particular data format) when receiving content from network originators 100–104 (FIG. 1). Through use of agents 110, 112, or direct network connections, the user can place an order for digital content, and then continue with other tasks. The order is fulfilled in the background, without user intervention. Delivery can be robust such that if a network connection is broken, a data transfer continues automatically when the network connection is reestablished. When content has been received, and its manifest accepted, modified or rejected according to user and local-system rules and/or policies, the user can be notified accordingly.

Figure 4:
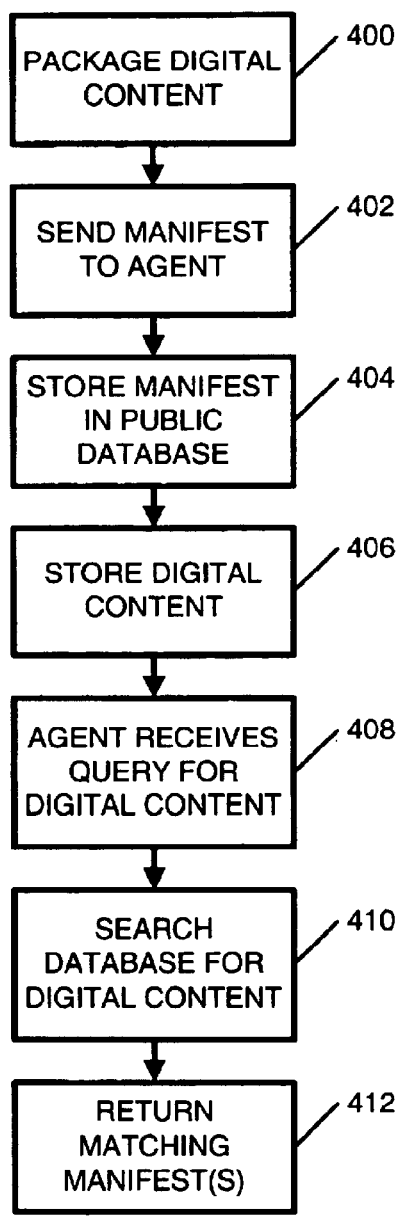
FIG. 4 is a flowchart illustrating, according to one embodiment of the invention, creating digital content for use by a receiver.

FIG. 4 is a flowchart illustrating, according to one embodiment of the invention, creating an electronic package of digital content for use by a receiver. As illustrated, a first operation is to package digital content 400 for distribution to receivers; as discussed above, in one embodiment, a manifest is used to package the content. A packaging program is used to identify content to be packaged and generate a corresponding manifest. Individual digital resources can be identified by way of traditional file selection dialogs, or with Object Linking and Embedding (OLE) type drag and drop operations, or through other selection techniques.

When created, the manifest contains references to identified resources, and if desired, a virtual structure corresponding to a physical good, e.g., a music CD. Thus, a receiving program for a music CD manifest would present a user interface displaying the virtual representation of the physical good. In the CD example, this might include rendering a CD jewel box with appropriate cover art and song listings as defined within the manifest.

A created manifest is sent 402 to an agent for distribution, which in turn stores 404 the manifest in a public storage. Note that the storage need not be publicly accessible, however public access is assumed so that search engines, agents, and other location applications are able to mine and/or index stored manifests. It is assumed that the agent stores the manifest in a database. The digital resources identified by the manifest are stored 406 as well. The digital resources may be stored in public or private storage locations depending on intellectual property rights for the digital resources.

Once the manifest has been created and stored, an agent can receive 408 a search query, e.g., purchase request, database look-up request, etc. The agent searches 410 through the database for manifests corresponding to the query. Assuming manifests are XML based, it will be appreciated that different query languages may be used depending on manifest formatting and database technology used to store the manifests. For example, the agent may use XML Query Language (XQL) queries, Stanford University's Lore query language, or other query languages.

Manifests matching the received 408 query are returned 412 to a requester. This may result in a request to purchase digital content identified by a manifest. Towards this end, the agent would confirm payment for digital content as required by a manifest, and make digital content available to a purchaser. Various known techniques may be employed to provide purchased digital content in a secure fashion so as to reduce possibility of illicit appropriation of the digital content, e.g., temporary names and locations for the digital resources included in the content, creation of secure communications channels or tunnels between the agent and purchases, or the like.

Figure 5:
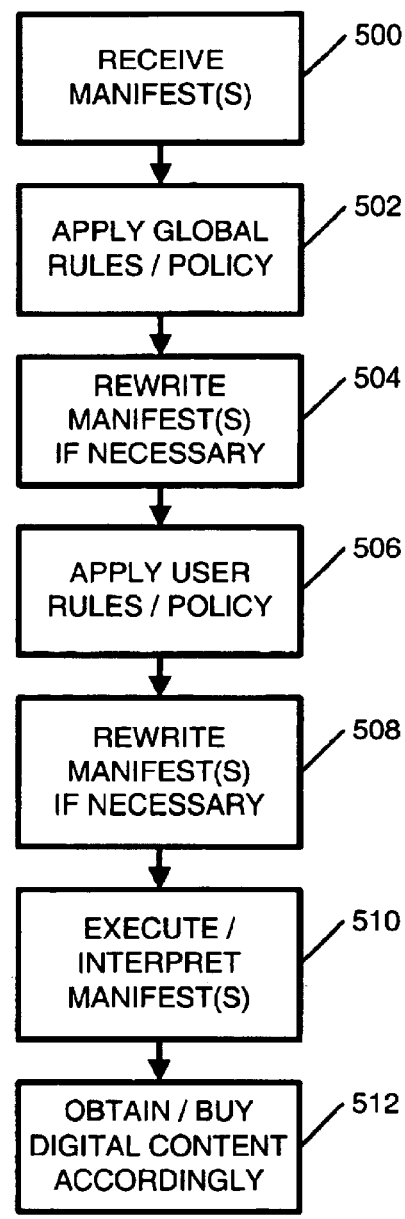
FIG. 5 is a flowchart illustrating, according to one embodiment of the invention, receiving a manifest or manifests from an agent, such as in response to a search query.

FIG. 5 is a flowchart illustrating, according to one embodiment of the invention, receiving 500 a manifest or manifests from an agent, such as in response to a search query. It is assumed the manifest is received by an application program, operating system extension, or the like, before a user/person is granted access to the manifest or allowed to take action on (e.g., purchase) the digital content referenced by the manifest.

When the manifest is received, a receiver 106, 108 (FIG. 1) applies 502, 506 rules or policies to the meta-data 208, 222, 234, 240, 244 (FIG. 2) to determine how to process the digital content, such as whether to reject some or all of the manifest. For example, a receiver may have local rules controlling whether to include supplemental content such as the videos 230, 236, (FIG. 2) MIDI encodings 212, 226 (FIG. 2), or other data not traditionally part of an original physical good, e.g., the music CD. A user preference may be set to cause discarding of any such supplemental manifest portions.

In one embodiment, there may be different rules or policies 506 for each user of the receiving device, e.g., the receiving device may be a multiple-user computer, in addition to global rules or policies that are applied 502 to all users of the computing device. For example, parental controls may be used to globally restrict the type of content that any user may receive, or content known to be incompatible with the receiver may be automatically edited out of a manifest. In one embodiment, a received manifest is rewritten 504, if necessary, to comply with the global rules or policies. Note that a remote management system can be used to set or change rules or policies.

After checking the manifest against global rules or policies, user rules or policies are then applied 506 to the manifest, and the manifest again rewritten 508, if necessary, to comply with the user rules or policies. In one embodiment, the process of "rewriting" a manifest is done in a rigorous manner. The rules controlling the rewriting are expressed in declarative form within the manifest itself within <choice> and <selection> tags, and their corresponding <condition> tags. This makes the rewriting process robust, and ensures the resulting rewritten manifest is valid. Once a received manifest has cleared both global and user rules or policies, the resultant manifest is executed or interpreted 510 by the receiver. As discussed above with respect to FIG. 3, such processing may cause a user interface to be displayed to allow a user selection among different choices provided by the manifest for buying or obtaining 512 digital content accordingly.

In one embodiment, manifests are encoded according to a rules based grammar comprising the following exemplary rules:

(1) container::=container*item*meta-data (2) item::=(item|component)$^+$choice*meta-data*condition*

(3) component::=resource meta-data*anchor*condition*

(4) meta-data::=meta-data*(component|statement) condition*

(5) anchor::=reference meta-data*condition*

(6) choice::=selection$^+$meta-data*condition*

(7) selection::=predicate meta-data*condition*

(8) condition::=predicate$^+$

Where: a container may be a hierarchical structure allowing items to be grouped to form logical packages that may be transported, exchanged, sold, stored, etc. An item is a grouping of sub-items and/or components associated with relevant meta-data about the item. Items may contain choices for customizing and/or configuring the item, and may be conditioned on predicates asserted by selections defined in the choices. A resource is a collection of data, such as an audio clip, image file, text document, or other data. A component is an association between a resource and all of its relevant meta-data; component meta-data will typically contain control or structural information about a resource, e.g., bit rate, media type, character set, encryption information, etc. A reference designates a portion of a resource, such as a specific location or range within the resource. A "statement" comprises a value and an associated domain for that value. And, a predicate is a non-substitutable token, and in one embodiment, has a true, false, or undecided value.

Figure 6:
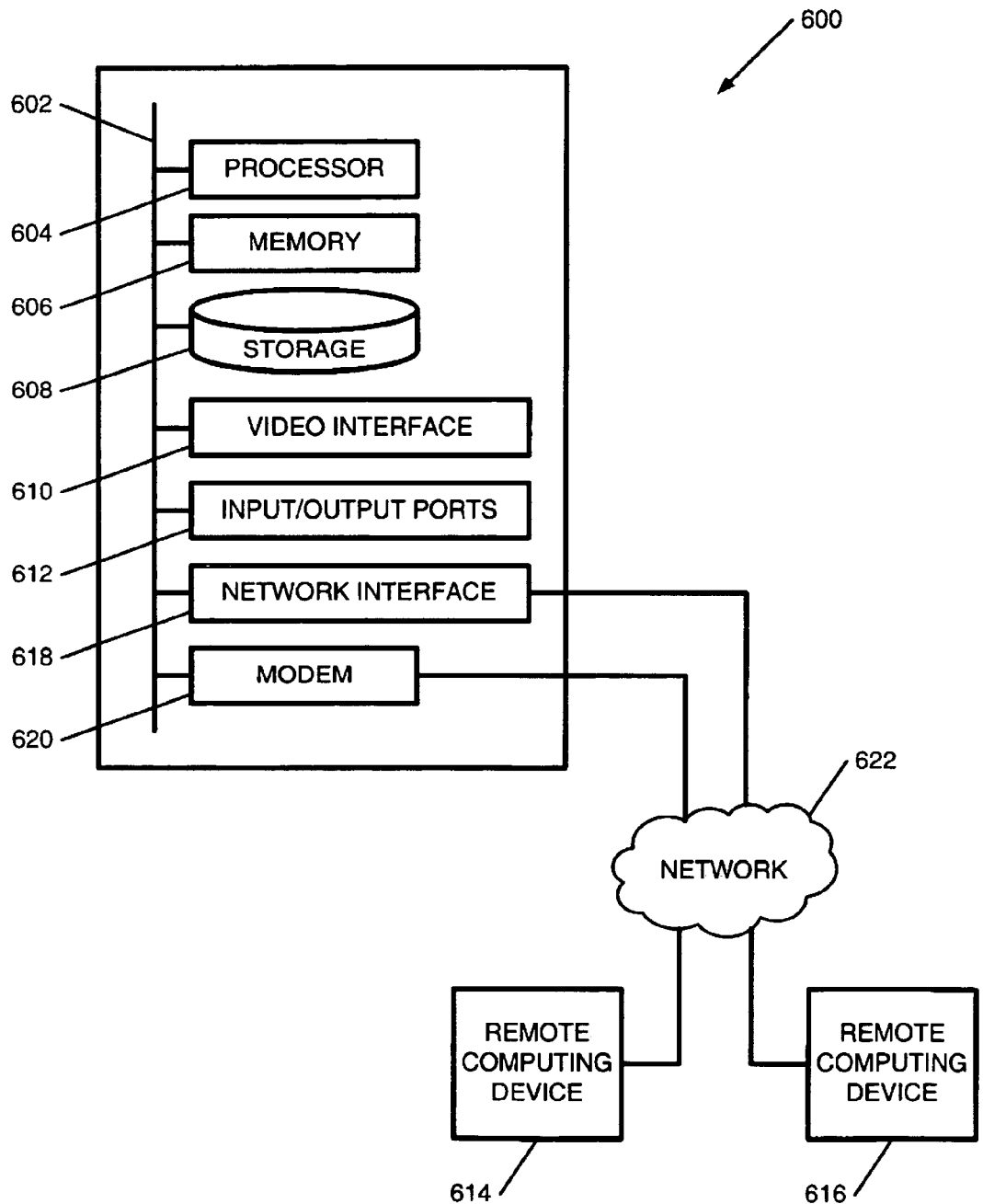
FIG. 6 illustrates a suitable computing environment in which certain aspects of the invention may be implemented.

FIG. 6 and the following discussion are intended to provide a brief, general description of a suitable computing environment in which certain aspects of the illustrated invention may be implemented.

An exemplary system for implementing the invention includes a computing device 600 having system bus 602 for coupling various computing device components. Typically, attached to the bus are non-programmable and programmable processors 604, a memory 606 (e.g., RAM, ROM), storage devices 608, a video interface 610, and input/output interface ports 612. Storage devices include hard-drives, floppy-disks, optical storage, magnetic cassettes, tapes, flash memory cards, memory sticks, digital video disks, and the like.

The invention may be described by reference to different high-level program modules and/or low-level hardware contexts. Those skilled in the art will realize that program modules can be interchanged with low-level hardware instructions. Program modules include procedures, functions, programs, components, data structures, and the like, for performing particular tasks or implementing particular abstract data types. Modules may be incorporated into single and multi-processor computing devices, Personal Digital Assistants (PDAs), cellular telephones, and the like. Thus, the storage systems and associated media can store data and executable instructions for the computing device.

As discussed above with respect to FIG. 1, the computing device is expected to operate in a networked environment using logical connections to one or more remote computing devices 614, 616 through a network interface 618, modem 620, or other communication pathway. Computing devices may be interconnected by way of a network 622 such as an intranet, the Internet, or other network. Modules may be implemented in a single computing device, or processed in a distributed network environment, and stored in both local and remote memory. Thus, for example, with respect to the illustrated embodiments, assuming computing device 600 is a computing device operated by a user searching for music in a particular genre, then remote devices 614, 616 may respectively be first and second agents that receive and respond to search issued by computing device 600.

It will be appreciated that remote computing devices 614, 616 may be configured like computing device 600, and therefore include many or all of the elements discussed for computing device. It should also be appreciated that computing devices 600, 614, 616 may be embodied in a single device, or separate communicatively-coupled components, and may include or be embodied in routers, bridges, peer devices, web servers, and application programs utilizing network application protocols such as the HyperText Transfer Protocol (HTTP), File Transfer Protocol (FTP), and the like.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come in the scope and spirit of the following claims and equivalents thereto:

1. A method for processing a collection of digital content received by a receiver having at least one policy affecting receipt of collections, comprising:
   receiving a manifest for a work comprising a description of data stored by the collection, a reference to a first digital resource, and meta-data describing the first digital content, wherein the manifest comprises a relationship between the reference and said meta-data so that the manifest includes structure corresponding to the work;
   testing compliance of the description with the policy;
   determining if the manifest can be edited to comply with the policy; and
   responsive to determining the manifest cannot be edited, disposing of the manifest.

2. The method of claim 1, further comprising:
   providing a search query for locating digital content to a search agent; and
   receiving the manifest in response to the search query.

3. The method of claim 1, further comprising:
   the manifest further comprising a second reference to second digital content, second meta-data describing the second digital content, and purchasing data for said first and second digital content;
   deciding to obtain the collection;
   determining the first digital content was not previously obtained;
   determining the second digital content has been previously been obtained; and
   purchasing only the first digital content in accord with said purchasing data.

4. The method of claim 1, further comprising:
   the manifest further comprising a second reference to second digital content, second meta-data describing the second digital content;
   deciding to obtain the first collection;
   determining the second digital content has been previously been obtained, said determining being based on the second digital content already being present in a selected one of: a cache, another collection, or a local storage device; and
   obtaining only the first digital content.

5. A digital content management system, comprising:
   a storage for storing digital content collections, wherein a collection comprises a link reference to digital content, and meta-data describing selected ones of said digital content and the collection;
   a communication agent communicatively coupled to the storage;
   a receiver communicatively coupled to the communication agent, said receiver configured to inspect said meta-data and process the collection accordingly;
   a transmitter communicatively coupled to the communication agent, said transmitter configured to inspect the reference to digital content to confirm retrievability of the digital content, and to make the collection available to other digital content management systems;
   a policy checker configured to check digital content collections received by the communication agent against a policy of the receiver;
   a digital content collection editor, communicatively coupled to the policy checker, said editor configured to change digital content collections to comply with the policy; and a digital content collection rejecter, communicatively coupled to said editor, said rejecter configured to reject received digital content collections;

wherein said digital content collection rejecter is configured to reject digital content collections that cannot be edited to comply with the policy.

6. The system of claim 5, further comprising:

a search agent configured to locate digital content satisfying search criteria, said locating including searching the storage for satisfying digital content.

7. The system of claim 6, wherein the storage is communicatively coupled to the system through a network connection.

8. The system of claim 5, further comprising:

a creation tool for creating the collection; and a user interface communicatively coupled to the creation tool, said user interface having a first interface tool to facilitate selection of the digital content, and a second interface tool to facilitate entering said meta-data.

9. The system of claim 5, further comprising:

a search agent configured to receive search criteria and search for digital content collections satisfying said search criteria; and a commerce agent comprising a purchasing tool configured to determine purchasing requirements for received digital content collections, and a payment tool configured to purchase digital content in accord with said purchasing requirements.

10. The system of claim 5, wherein digital content collections are encoded with a hierarchical tag based markup language.

11. An article comprising a machine accessible medium having instructions encoded thereon for processing a collection of digital content received by a receiver having at least one policy affecting receipt of collections, said instructions, which when executed by a machine, result in the machine performing:

receiving a manifest for a work comprising a description of data stored by the collection, a reference to a first digital resource, and meta-data describing the first digital content, wherein the manifest comprises a relationship between the reference and said meta-data so that the manifest includes structure corresponding to the work;

testing compliance of the description with the policy;

determining if the manifest can be edited to comply with the policy; and responsive to determining the manifest cannot be edited, disposing of the manifest.

12. The article of claim 11, wherein the instructions further result in the machine performing:

providing a search query for locating digital content to a search agent; and receiving the manifest in response to the search query.

13. The article of claim 11, the manifest further comprising a second reference to second digital content, second meta-data describing the second digital content, and purchasing data for said first and second digital content, and wherein the instructions further result in the machine performing:

deciding to obtain the collection;

determining the first digital content was not previously obtained;

determining the second digital content has been previously obtained; and purchasing only the first digital content in accord with said purchasing data.

14. The article of claim 11, the manifest further comprising a second reference to second digital content, and second meta-data describing the second digital content, and wherein the instructions further result in the machine performing:

deciding to obtain the first collection;

determining the second collection has been previously obtained, said determining being based on the second digital content already being present in a selected one of: a cache, another collection, or a local storage device; and obtaining only the first digital content.

* * * * *